United States Patent [19]

Schmidt et al.

[11] Patent Number: 4,507,459
[45] Date of Patent: Mar. 26, 1985

[54] POLYURETHANE COMPOSITIONS HAVING LOW HYSTERESIS

[75] Inventors: Andreas R. Schmidt, Reinach, Switzerland; Herbert F. Strohmayer, Allentown, Pa.; Walter Sibral, Tulln, Austria; Barton Milligan, Coplay, Pa.

[73] Assignee: Air Products and Chemicals, Inc., Allentown, Pa.

[21] Appl. No.: 578,240

[22] Filed: Feb. 8, 1984

[51] Int. Cl.³ .................... C08G 18/10; C08G 18/32
[52] U.S. Cl. ........................... 528/64; 528/63; 528/65; 152/330 R
[58] Field of Search .................... 528/64, 63, 65

[56] References Cited

U.S. PATENT DOCUMENTS

| 2,713,884 | 7/1955 | Schwartz | 152/330 |
| 3,194,793 | 7/1965 | Kogon | 260/77.5 |
| 3,456,037 | 7/1969 | Hoeschele | 260/858 |
| 3,563,906 | 2/1971 | Hoeschele | 252/182 |
| 3,736,295 | 5/1973 | Meckel et al. | 260/75 |
| 3,752,790 | 8/1973 | McShane, Jr. et al. | 260/77.5 |
| 3,846,351 | 11/1974 | Huffaker et al. | 260/2.5 |
| 4,002,584 | 1/1977 | Takahashi et al. | 260/18 |
| 4,017,464 | 4/1977 | Kimball | 260/77.5 |
| 4,044,811 | 8/1977 | Dudek et al. | 152/354 |
| 4,048,105 | 9/1977 | Salisbury | 260/2.5 |
| 4,090,547 | 5/1978 | Schmidt | 152/354 |
| 4,218,543 | 8/1980 | Weber et al. | 521/51 |
| 4,254,272 | 3/1981 | Chung et al. | 560/19 |
| 4,296,212 | 10/1981 | Ewen et al. | 521/163 |

Primary Examiner—Herbert S. Cockeram
Attorney, Agent, or Firm—Russell L. Brewer; James C. Simmons; E. Eugune Innis

[57] ABSTRACT

This invention pertains to the synthesis of polyurethane systems having low hysteresis. The systems are generated by reacting a prepolymer of a mononuclear diisocyanate and a polyol with a chain extender mix of a mononuclear aromatic diamine and a polyol. The prepolymer should have a free isocyanate content of from 2 to about 12% by weight and the chain extender mix should have an amine to polyol equivalent from about 0.5 to 5:1.

18 Claims, 2 Drawing Figures

POLYMER SEGMENTS OF TOLUENE DIISOCYANATE AND TOLUENE DIAMINE

A

U.S. Patent  Mar. 26, 1985  4,507,459
FIG. I
POLYMER SEGMENTS OF TOLUENE DIISOCYANATE AND TOLUENE DIAMINE
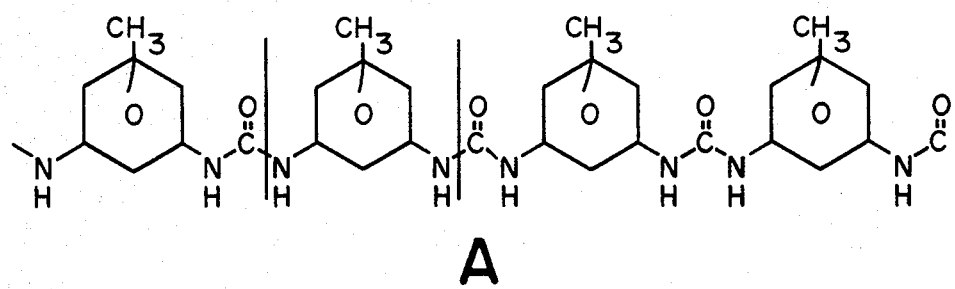
A
POLYMER SEGMENTS OF TOLUENE DIISOCYANATE AND MOCA
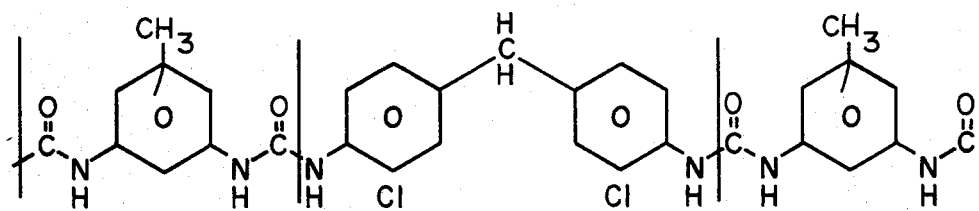
B and propylene glycol with 4,4'-methylene diphenyl diisocyanate.

U.S. Pat. No. 4,044,811 shows the manufacture of a laminated tire which utilizes a polyurethane formed from a prepolymer of toluene diisocyanate and a polyalkylene glycol such as poly(tetramethylene ether glycol) and a diamine chain extender such as ethylene diamine, methylene-bis-(2-chloroaniline) (MOCA) and the like.

U.S. Pat. No. 4,090,547 shows the manufacture of a urethane tire wherein the urethane is formed by reacting a prepolymer of poly(tetramethylene ether glycol) and toluene diisocyanate having an isocyanate content of about 4% with metaphenylene diamine as a chain extender. Similar formulations utilize MOCA as the chain extender.

There are numerous references showing the manufacture of polyurethane resins for various applications using a variety of diamine chain extenders. Such references include:

U.S. Pat. No. 3,563,906 discloses formaldehyde condensed amine curing agents for liquid isocyanato-terminated polyurethanes. Representative amine curing agents include hindered or negatively substituted aromatic diamines such as methylene bis-chloroaniline, and dichlorobenzidine. The formaldehyde condensed amines have moderate reactivity and a limited tendency to crystallize under operating conditions.

U.S. Pat. No. 3,194,793 discloses polyurethane mixtures cured with aromatic primary and secondary amines. Representative amines include 4,4'-methylene-bis(2-chloroaniline) (MOCA), diphenyl propylenediamine, diamino diphenyl ether, naphthalene diamine, toluene diamine, various halogenated and alkoxylated benzidines, e.g. dimethoxy benzidine and dichlorodimethyl benzidene.

U.S. Pat. No. 4,017,464 discloses polyurethane compositions formed by reacting toluene diisocyanate with polytetramethylene ether diol and then cross-linking with a diamino diphenyl disulfide curing agent. Such compositions are alleged to be well suited for tire manufacture.

U.S. Pat. No. 4,002,584 discloses urethane elastomers formed by reacting a long chain polyol with an organic diisocyanate and a halogenated aromatic diamine such as methylene-bis-dichloroaniline, dichlorodibromodiaminodiphenyl methane, tetrabromobenzidine and other halogenated aromatic diamines.

U.S. Pat. No. 3,846,351 discloses a method for preparing flexible polyurethane foams by reacting a polyether polyol with an organic diisocyanate and cross-linking with a dialkyl paraphenylene diamine. Examples of chain extenders include diisopropylphenylenediamine, di-sec butyl-paraphenylene diamine.

U.S. Pat. No. 4,254,272 discloses polyurethanes formed by reacting an organic diisocyanate with a polyol and then curing with a substituted aromatic diamine consisting of diamino-tert-alkyl benzoates and diamino-tert-alkyl benzonitriles. Specific examples of the diamines include methyl diamino-tert-butyl benzoate; octadecyl diamino-tert-butyl benzoate and comparable alkyl benzonitriles.

U.S. Pat. No. 3,736,295 discloses the preparation of polyurethane elastomers by reacting an organic diisocyanate with an organic polyol utilizing an aromatic diamine containing ether groups and chlorine atoms in the ortho position as a chain extender.

U.S. Pat. No. 3,752,790 discloses various amine curing agents for liquid polyurethanes having free isocya-

POLYURETHANE COMPOSITIONS HAVING LOW HYSTERESIS

TECHNICAL FIELD

This invention relates to polyurethane molding compositions having low hysteresis. These molding compositions are well suited for high shock and vibration environments.

BACKGROUND OF THE PRIOR ART

The use of polyurethane elastomer formulations in the manufacture of molded products by a variety of techniques which include injection molding, rotational molding or casting and reaction injection molding (RIM) is widely known. These formulations for use in various applications are formed by reacting a polyisocyanate with a polyol and, in some cases, then chain extending with a diamine or polyol chain extender to provide rigidity. Typically, such formulations will utilize an aromatic diisocyanate, a polyol, and a diamine chain extender.

In the processing of urethane formulations to form molded products substantial attention to the selection of the isocyanates and chain extenders is necessary to achieve the desired end properties. In the manufacture of large units, particular attention has to be given to the chain extender, not only in terms of its contribution to the end properties of the product, but also its contribution in terms of the processing characteristics. Aliphatic and many aromatic amine chain extenders are highly reactive and gelation of the urethane formulation occurs prior to completion of the molding operation. In their active state they are unsuited for those applications. With aromatic amines, it is possible to incorporate groups which sterically hinder the amine molecule or to incorporate electronegative groups which make the molecule less reactive. These less reactive amines then may be used in the particular molding applications.

Molded products for use in applications such as motor mounts, shock absorber, and vibration dampeners must have an ability to resist heat build up due to internal frictional causes and they must be impact resistant. Tires either for passenger car service or larger tires as, for example, trucks and farm tractors, have to meet rigid requirements in terms of impact resistance, abrasion resistance and thermal resistance, etc. Tires are also exposed to heavy flexing and internal heat is generated which can cause thermal degradation of the polymer. To withstand this flexing the polymers must have a low hysteresis in order to avoid excessive heat generation. Further because tires are of significant size, they present an additional problem with respect to their manufacture. The processing techniques have to be closely mentioned so that gelation does not occur prior to filling the mold.

Representative patents showing some urethane formulations, and particularly diamine chain extenders as well as applications and molding techniques for tire formulations, are as follows:

U.S. Pat. No. 2,173,884 shows the manufacture of a tire composition having a tread section of polyester-diisocyanate elastomer bonded with an adhesive formulation of polyalkylene ether glycol diisocyanate elastomer to a rubber tire stock. The polyester diisocyanate elastomer was formed by reacting adipic acid with ethnate groups. Examples include dichlorotoluene diamine and chlorotoluene diamine as the amine curing agents. The chlorinated toluene diamines are alleged to improve hardness and modulus of the urethane composition.

U.S. Pat. Nos. 4,048,105; 4,218,543 disclose molding urethane formulations by the technique of reaction injection molding (RIM). The systems utilize a formulation consisting of a quasi-prepolymer consisting of the reaction product of a low molecular weight diol or triol and an organic isocyanate e.g. methylene bis(4-phenyl isocyanate) with a polyol blend consisting of polyol, amine chain extender and catalyst. Examples of the amine chain extenders include the unhindered aromatic polyamine, such as methylene dianiline (MDA). The '543 patent uses an alkylated diamine, such as diethyltoluene diamine as a chain extender in a RIM process. These alkylated aromatic diamines result in extending gelation time as compared to the unhindered aromatic diamines. In practice the isocyanates and amine chain extenders were selected on the basis of reactivity and performance. Reactivity was altered by using an inactive isocyanate with an active diamine or vice versa. Performance was generally good because of the inherent abrasion resistance and toughness of the urethane polymer. However, even though urethane polymers have good physical properties and are suited for application in tires, they have enjoyed little commercial success. They simply have not competed with rubber for tires in terms of high speed performance and cost.

SUMMARY OF THE INVENTION

This invention relates to an improved polyurethane composition formed by reacting (1) a prepolymer formed by reacting (a) an aromatic polyisocyanate represented by the formula:

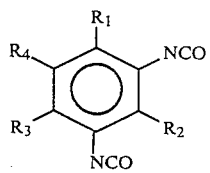

where $R_1$, $R_2$, $R_3$ and $R_4$ are hydrogen, alkyl having 1-4 carbon atoms, nitrile, halogen, $CO_2R_5$, $CONR_6R_7$ where $R_5$ is an alkyl group of 1-6 carbon atoms, and $R_6$ and $R_7$ are hydrogen or an alkyl of 1-6 carbon atoms.

with (b) a difunctional polyol of a molecular weight from 500–5000, said prepolymer having an excess isocyanate content of from about 2 to 12%, with (2) a chain extender mix comprising a long chain defunctional polyol of a molecular weight of from 500–5000 in combination with an aromatic diamine represented by the formula:

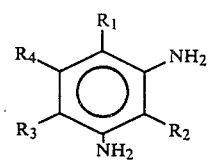

where $R_1$, $R_2$, $R_3$ and $R_4$ are hydrogen, alkyl having 1-4 carbon atoms, nitrile, halogen, $CO_2R_5$, $CONR_6R_7$ where $R_5$ is an alkyl group of 1-6 carbon atoms, and $R_6$ and $R_7$ are hydrogen or an alkyl of 1-6 carbon atoms.

said polyol being present in an amount to provide from 0.5 to 5 equivalent amine per equivalent polyol by weight of said chain extender mix and then curing the resulting reaction product.

Some of the significant advantages of the invention are:

the resulting polyurethane molding compositions have a low hysteresis such that when loaded and compressed (flexed) in rapid manner there is low heat buildup;

there is extended resistance to thermal failure;

the polyurethane has good tear propagation resistance; and there is less energy expended in flexing because of low hysteresis thus making the compositions attractive for energy consuming applications, in particular tires, because of the reduced rolling resistance attributed to internal frictional forces.

THE DRAWING

FIG. 1A represents the formula for a prepolymer of toluene diisocyanate chain extended with toluene diamine. The view shows that section where the toluene diisocyanate is combined with the toluene diamine and excludes the polyol portion.

FIG. 1B represents the formula for a prepolymer toluene diisocyanate chain extended with methylene-bis(2-chloroaniline). The view shows that section where the toluene diisocyanate is combined with the diamine and excludes the polyol.

DESCRIPTION OF THE PREFERRED EMBODIMENTS

In the manufacture of the urethane compositions of the present invention, a prepolymer is formed by reacting an aromatic isocyanate of the formula:

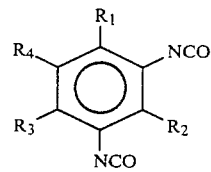

where $R_1$, $R_2$, $R_3$ and $R_4$ are hydrogen, alkyl having 1-4 carbon atoms, nitrile, halogen, $CO_2R_5$, $CONR_6R_7$ where $R_5$ is an alkyl group of 1-6 carbon atoms, and $R_6$ and $R_7$ are hydrogen or an alkyl of 1-6 carbon atoms with a long-chain polyol.

The isocyanate as shown can be substituted with a variety of groups without substantially interfering with the hysteresis properties of the polymer. In some cases where a plurality of large alkyl groups is present on the molecule there may be some steric hindrance as compared to a short chain, mono alkyl substituted molecule such as toluene diisocyanate. Specific isocyanates suited for practicing the invention include toluene diisocyanate, phenyl diisocyanate, xylyl diisocyanate, diethyl toluene diisocyanate, and chlorotoluene diisocyanate.

The polyol used in forming the prepolymer is either a polyalkylene ether, polylactone or polyester polyol particularly those conventionally used in the production of elastomeric polyurethanes. These polyol systems include organic compounds which contain at least two hydroxyl groups and have a molecular weight from about 500 to 5000 and preferably a molecular weight from about 1,000 to about 3,000. Polyester polyols which are linear or slightly branched can be used and are obtained by the reaction of carboxylic acids and mono or polyhydric alcohols which include amino alcohols and diamino alcohols. Examples of polycarboxylic acids used for preparing polyester polyols include oxalic acid, malonic acid, succinic acid, glutaric acid, subaric acid, azelaic acid, maleic acid, fumaric acid and the like as well as hydroxy carboxylic acids. Polyols used in the preparation of the polyester polyols include ethylene glycol, propylene glycol, butylene glycol, pentane diol, hexane diol and heptane diol.

Another class of polyols suited for preparing the polyisocyanate prepolymers include polyether polyols and are derived by condensing an alkylene oxide with an initiator. Initiators generally are difunctional compounds and include glycols such as ethylene glycol, propylene glycol, hexane diol, and the like. Triol functionality can also be used and blended with difunctionality e.g. up to 10% by weight. Preferred polyols are the polyether polyols such as poly(tetramethyleneglycol) and polycaprolactone.

The isocyanate and polyol can be reacted together, in conventional manner, to form a prepolymer. The proportion of each reactant is controlled so that there is a free isocyanate content of about 2–12% by weight. When less then 2% isocyanate is present in the polymer, it is difficult to incorporate the amine chain extender into the polymer with desired uniformity and to achieve desired rigidity. When more than 12% free isocyanate is present, the prepolymer may be too reactive with the chain extender mix to achieve proper molding. And, if a less reactive amine chain extender is employed, the molding operation may be excessive in terms of time. Normally, for desirable molding operations, the free isocyanate content is from 3–9% by weight.

The chain extender mix used for the polyurethane molding composition consists of an aromatic diamine of the formula:

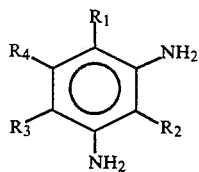

and a polyalkylene ether, polylactone or polyester diol. The polyalkylene ether or polyester diol suitably is the same as that used in manufacturing the prepolymer, but can be any of the polyalkylene ether or polyester diols commonly used. It is incorporated into the chain extender mix in a proportion to provide from about 0.5–5 equivalent amine per equivalent polyol, preferably 1–3 equivalents amine per equivalent polyol. Optionally, small amounts of short chain ($C_{2-14}$) diol or triol chain extender can be included in the chain extender mix such as, for example, up to 10% of the hydroxy functionality. Ethylene glycol, butylene glycol, glycerol or higher polyol, e.g. penterythritol, can be used. However, no significant advantages are achieved by incorporating a triol or higher polyol, and in some cases, the incorporation inhibits the ability of the product to withstand flexing.

Although not intending to be bound by theory, it is believed the polyurethane molding composition formed by reacting the prepolymer and chain extender mix in the manner described above to produce a product having a low hysteresis, is the result of a combination of factors. One factor is that the aromatic diisocyanate and the aromatic diamine chain extender has substantial symmetry between the molecules of the prepolymer and of the chain extender. When the polymer is stretched or flexed, as the case may be, the molecules separate, and upon relaxation, they rejoin through hydrogen bonding at a common angle. Minimum energy is required to break these bonds, and therefore, there is little heat build up in the polymer. When nonsymmetrical diamine chain extenders vis-a-vis the isocyanate are used and the molecules separate, they cannot rejoin at a common angle. The rejoined bonds require more energy to break, and because the polymer system cannot dissipate this energy, the polymer system is more susceptible to failure. Reference is made to FIGS. A and B which show this feature. In A it can be seen that when a polymer segment of toluene diisocyanate and toluene diamine is disrupted the angle between the diamine and the diisocyanate remains the same and it can rejoin at that angle leaving the polymer intact. But, when viewing a segment of a polymer of toluene diisocyanate and MOCA, as shown in B, it is noted that joinder cannot occur in the original fashion, or at least joinder in the original fashion is unlikely. As a result the breaking of the rejoined bonds requires more energy and there is increased energy buildup.

Another factor in the generation of the polyurethane molding composition is the use of a long chain diluent polyol chain extender with the diamine to permit dispersion of the aromatic diamine into the prepolymer mix prior to reaction. The rate of reaction between the terminal hydroxyl groups of the polyol vis-a-vis the amino groups, is perhaps an order of magnitude slower. Initially, a series of hard segments are formed by the reaction of the isocyanate with the diamine at uniform locations. After reaction of the diamine with the isocyanate in the prepolymer, then a series of soft segments are formed by the reaction of the polyol with the excess diisocyanate. This technique permits the formation of a polymer with soft segments interposed between uniform hard segments. This combination is believed responsible for the ability of the polymers to flex without tearing. If once diamine is not dispersed in the long chain polyol for chain extension, then polymer properties deteriorate presumably because it is practically impossible to achieve uniform dispersion of the diamine in the prepolymer prior to reaction. Also if one used a short chain polyol as the chain extender e.g. one that had a molecular weight below 500 e.g. butanediol there would be too much rigidity to the system.

The ratio of free isocyanate content in the prepolymer to amines in the chain extender mix is also related to hysteresis. Typically when the concentration of NCO is at the higher end of the range, one uses a lower proportion of amine to polyol in the chain extender mix. Alternatively if the NCO content is low, higher levels of amine to polyol can be used. For example, if the level of isocyanate content is from 8–12% weight one may utilize amine to hydroxyl levels from 0.5 to 1 equivalent amine per equivalent polyol. At levels from 2–6% NCO one may tolerate levels of 2–5 equivalents amine/equivalent polyol. By varying the ratio of amine to NCO, one alters the frequency of hard segments to soft segments and thereby influences the degree of hysteresis.

Trifunctional polyols or trifunctional amines when used in formulating the polyurethane molding composition provide too much rigidity through a three dimensional network and do not permit sustained flexing. Accordingly, a difunctional polyol or a difunctional amine is required as a major portion of the polyol in the prepolymer and chain extenders, e.g. 90% or greater equivalent functionality to establish a two-dimensional polymer network.

It is understood that conventional plasticizers, fillers, pigments, and other additives commonly used in molding applications can be used here. As is customary with the use of additives their effect/performance characteristics need to be evaluated as they sometimes may reduce performance.

The following examples are provided to illustrate embodiments of the invention and are not intended to restrict the scope thereof. All parts are listed as parts by weight and percentages are listed as mole percentages.

EXAMPLE 1

A polyalkylene ether isocyanate prepolymer comprising about 5.17% free NCO groups was prepared in conventional manner from about 1000 g of a linear alkylene polyol i.e. poly(tetramethylene glycol) having a molecular weight of about 2000 and a hydroxyl number of 56, and about 217.7 g of toluene-2,4-diisocyanate and toluene-2,6-diisocyanate in an isomer ratio of about 80:20 by first mixing the components and then heating for about 1 hour at a temperature of 80° C. (Any ratio of 2-4 to 2-6 isomer can be used.)

A chain extender mix was prepared by mixing 1,000 g parts of poly(tetramethylene glydol) having a molecular weight of 2,000 and a hydroxyl number of 56 with 122 g of toluene diamine, the toluene diamine being the 2:4 and 2:6 isomer and present in a ratio of 80:20. In addition to the polyol and amine, there was included 350 g dioctyl phthalate and 10 g of Metasol catalyst.

A polyurethane elastomer molding formulation was then formed from the prepolymer and chain extender mix in conventional manner by mixing 60 parts by weight of the chain extender mix with 100 parts by weight of the prepolymer and then curing at a temperature of 100° C.

EXAMPLE 2

A series of polyurethane molding formulations were prepared in similar manner to the polyurethane molding formulation in Example 1 except that various aromatic diisocyanates, polyols and aromatic diamines were used to prepare the prepolymer and chain extender mix as well as being added in various amounts. The molding formulations are shown in Table 1.

The polyurethane molding formulations set forth in Example 1 and in Table 1 were evaluated with respect to hysteresis by the use of a modified Goodrich flexometer operated at 25°–30° C. This flexometer is designed to simulate the load experienced by a tire, i.e., the flexing caused by compression and relaxation, of the test sample. In this test a 5–10 gram sample having a cylindrical shape is placed under a fixed load between a plate and plunger. The plunger is moved inwardly and then outwardly to the original loading position at a rate simulating the speed encountered by a tire until the sample fails. At the time of failure, as indicated by a softening of the urethane molding formulation, the temperature at the center of the polymer cylinder is measured and the failure time recorded. Table 2 provides the end temperature and failure time as well as other various physical properties of the urethane molding formulations of Example 1 and Runs 2 through 15.

TABLE I

| | PREPOLYMER A | | | CHAIN EXTENDER MIX B | | Parts Amine | Part A |
|---|---|---|---|---|---|---|---|
| Run | Isocyanate/Parts | Polyol/Parts | % NCO Prepolymer | Aromatic Amine | Polyol | Parts Polyol | Part B |
| 2 | Toluene Diisocynate (TDI) 2.5 | Polytetramethylene Glycol/1 | 5.17 | Toluene Diamine (TDA) | No Polyol | — | 100:8 |
| *3 | Toluene Diisocyanate (TDI) 2.5 | No Polyol | — | Toluene Diamine (TDA) | Polytetramethylene Glycol | 2:1 | — |
| *4 | (TOI)/5 | Trimethylolpropane/5 | 29.3 | Toluene Diamine (TDA) | Polytetramethylene Glycol | 2:1 | — |
| 5 | (TDI)/2.5 | Polytetramethylene Glycol/1 | 5.17 | Methylene bis-chloro Aniline (MOCA) | Polytetramethylene Glycol | 2:1 | 100:50 |
| 6 | " | Polycaprolactone/1 | 5.17 | 2,4-diamino-35 Diethyl Toluene Diamine (DETDA) | Polycaprolactone | 2:1 | 100:50 |
| 7 | " | Polytetramethylene glycol/1 | 5.17 | TDA | Polytetramethylene glycol | 2:1 | 100:76 |
| 8 | " | Polycaprolactone/1 | 5.17 | TDA | Polytetramethylene glycol | 2:1 | 100:78 |
| 9 | Methylene diphenyl diisocyanate/2.5 | Polycaprolotone/1 | 4.85 | TDA | Polycaprolactone | 2:1 | 100:58 |
| 10 | TDI/5 | Polytetramethylene glycol/1 | 11.7 | 4-chlor-m-phenylene diamine | Polytetramethylene glycol | 4:1 | 100:73 |
| 11 | TDI/2 | Polycaprolactone/1 | 3.55 | m-phenylenediamine | Polycaprolactone | 1:1 | 100:39 |
| 12 | TDI/2 | " | 3.55 | 3,5-diamino-4-chloro- | " | 1:1 | 100:43 |
| 13 | TDI/2 | " | 3.55 | methylene dianiline (MDA) | " | 1:1 | 100:34 |
| 14 | TDI/2.5 | " | 5.17 | tetra isopropyl MDA | " | 1:1 | 100:72 |
| 15 | TDI/2.9 | " | 6.37 | 5-chloro-TDA | " | 1:1 | 100:74 |

*Run 3 - The TDA and chain extender mix reacted too fast to mold.
*Run 4 - The viscosity of the prepolymer was too high so it was not possible to mix with the chain extender mix.

TABLE II

| Run No. | Flex Test End Temp. °C. | Flex Test Failure Time | Shore Hardness Elongation % at Break | Tensile $Kp/cm^2$ | Tear Propagation Resistance |
| --- | --- | --- | --- | --- | --- |
| 1 | 200 | 12 min. | 69/700 | 450 | 56 |
| 2 | impossible to test | | 86/400 | 130 | 35 |
| 3 | " | — | — | — | — |
| 4 | " | — | — | — | — |
| 5 | 170 | 1.5 min. | 80/860 | 410 | 43 |
| 6 | 180 | 5 min. | 67/620 | 450 | 47 |
| 7 | 200 | 14 min. | 76/680 | 310 | 41 |
| 8 | 200 | 10 min. | 77/580 | 210 | 38 |
| 9 | 180 | 2 min. | 53/690 | 175 | 49 |
| 10 | impossible to test | — | — | — | — |
| 11 | 180 | 5 min. | 67/700 | 250 | 46 |
| 12 | 190 | 5 min. | 72/840 | 250 | 44 |
| 13 | 180 | 1.5 min. | 71/740 | 165 | 36 |
| 14 | 170 | 1.5 min. | 74/650 | 110 | 36 |
| 15 | 190 | 6 min. | 60/740 | 260 | 44 |

A review of the results in Table II shows that prepolymers formed with an aromatic diisocyanate and a polyalkylene ether glycol with a corresponding aromatic diamine-polyalkylene glycol chain extender results in products having good flexibility with low heat build up during flexing. (Note Runs 1, 6, 7 and 8.) Where the prepolymer was formed using a trifunctional polyol in place of a difunctional polyol, even though the diamine chain extender was a preferred chain extender, heat buildup occurred and there was insufficient flexibility to permit testing. (Note Run 4).

Run 6 also shows that good polymers can be produced with substituted or slightly hindered aromatic diamine chain extenders such as DETDA, chloro TDA and a carboxylated TDA. Although these particular chain extenders alter the rate in which the polyurethane molding formulation cures, they do not significantly increase the hysteresis of the molding composition to a level comparable to MOCA (Run 5). Run 9 also shows the adverse effect in terms of increased hysteresis when using an aromatic diamine with an aromatic diisocyanate where the symmetry of the chain extender molecule does not match the symmetry of the diisocyanate. For example, in the case of a urethane from methylene diphenyldiisocyanate and TDA chain extender, there is this lack of symmetry and, accordingly, the flexometer readings are much lower than where symmetry exists (see Run 2).

STATEMENT OF INDUSTRIAL APPLICATION

The polyurethane compositions of this invention, by virtue of their low hysteresis, have application in the manufacture of tires suited for high speed and for molded products exposed to high shock and vibration environments.

EXAMPLE 3

Reinforced urethane tires for passenger cars were manufactured using equipment similar to that described in U.S. Pat. No. 4,043,725 The tires were loaded at 150% or 615 Kp and initially rotated at a rate to provide a circumferential speed of 75 Km/hr. In another test they were loaded to 410 Kp and rotated for 1 hour at a speed of 180 Km/hr., then 10 minutes at 190 Km/hr. and then at 200 Km/hr. until failure. Tires were prepared from a prepolymer of toluene diisocyanate and poly(tetramethylene ether glycol) (PTMG). In one case a chain extender mix of MOCA and PTMG was used and in another case a chain extender mix of toluene diamine and PTMG was used. The formulations using MOCA as the chain extender were similar to Run 5 of Example 2, and the one using TDA were similar to Example 1. The MOCA chain extended formulations failed much quicker than the tires formulated with toluene diamine chain extenders. In some cases, the tires formulated with the MOCA extended urethane did not even complete the initial test phases. The tires failed due to excessive heat buildup.

We claim:

1. In a urethane composition formed by reacting a prepolymer having an excess of isocyanate groups with an aromatic diamine chain extender and then curing the resulting composition, the improvement for producing a polyurethane composition having low hysteresis which comprises reacting:

(A) a prepolymer formed by the reaction of (1) an aromatic polyisocyanate represented by the formula:

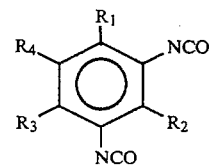

where $R_1$ $R_2$ $R_3$ $R_4$ represents H, alkyl from $C_{1-4}$ atoms, CN, halogen, $CO_2$ $R_5$, $COR_6R_7$ where $R_5$ represents alkyl of $C_{1-6}$ atoms and $R_6$ $R_7$ represents alkyl of $C_{1-6}$ atoms and H, and (2) a polyol of about about 500–5000 molecular weight of which at least 90% of the polyol is difunctional in a quantity sufficient to provide from about 2 to 10% molar excess isocyanate groups in said prepolymer; with, (B) a chain extender mix comprising an aromatic diamine represented by the formula:

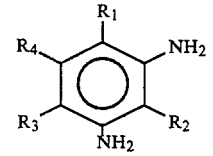

where $R_1$ $R_2$ $R_3$ $R_4$ represents H, alkyl from $C_{1-4}$ atom, CN halogen, $CO_2$ $R_5$, $COR_6R_7$ where $R_5$ represents alkyl of $C_{1-6}$ atoms and $R_6$ $R_7$ represents alkyl of $C_{1-6}$ atoms and H, and (2) a polyol of about about 500–5000 molecular weight of which at least 90% of the polyol is difunctional, said diamine being present in said chain extender mix in a proportion to provide from 0.5 to 5 equivalent amine per equivalent polyol; and then,
curing the resulting reaction product.

2. The urethane composition of claim 1 wherein said isocyanate in said prepolymer is toluene diisocyanate, an alkyl or halo-substituted derivative of toluene diisocyanate or m-phenylene diisocyanate.

3. The urethane composition of claim 2 wherein at least 90% of the amine equivalent in the chain extender mix is toluene diamine, an alkyl or halo-substituted derivative of toluene diamine; or m-phenylene diamine.

4. The urethane composition of claim 3 wherein said polyol in said prepolymer mix is a polyether, polyester, or polylactone polyol and has a molecular weight from 1000–3000.

5. The urethane composition of claim 4 wherein said polyol in said chain extender mix is a polyether, or polyester polyol.

6. The urethane composition of claim 4 wherein said polyol is polytetramethylene glycol or polycaprolactone diol.

7. The urethane composition of claim 5 wherein said aromatic diamine is toluene diamine.

8. The urethane composition of claim 5 wherein said aromatic diamine is diethyltoluene diamine.

9. The urethane composition of claim 5 wherein said aromatic diamine is chlorotoluene diamine.

10. The urethane composition of claim 5 wherein said aromatic diamine is m-phenylene diamine.

11. The urethane composition of claim 5 wherein said aromatic diamine is

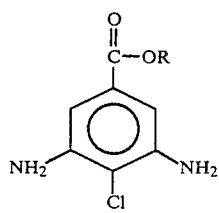

where R is an alkyl group from 1–6 carbon atoms.

12. The urethane composition of claim 3 wherein said isocyanate in said prepolymer is derived from m-phenylene diisocyanate and said diamine is m-phenylene diamine.

13. The urethane composition of claim 3 wherein said isocyanate in said prepolymer is toluene diisocyanate and said diamine is toluene diamine.

14. The urethane composition of claim 13 wherein said polyol used in the prepolymer and chain extender is poly(tetramethylene glycol).

15. The urethane composition of claim 11, where the isocyanate content in the prepolymer is from 3 to 10% and the proportion of aromatic amine in said chain extender mix provides from 1 to 3 equivalents amine per equivalent polyols.

16. In a urethane composition formed by reacting a prepolymer having an excess of isocyanate groups with an aromatic diamine chain extender and then curing the resulting reaction product, the improvement for producing a urethane compoition having low hysteresis which comprises reacting:
(A) a prepolymer formed by the reaction of sufficient toluene diisocyanate with polyol having a molecular weight from 500–5000 and wherein at least about 90% of the polyol is difunctional to provide a prepolymer having a free isocyanate content of from about 3–10% by weight, with
(B) a chain extender mix comprising an aromatic diamine selected from the group consisting of chlorotoluenediamine, diethyl toluene diamine and toluene diamine and difunctional polyol of essentially the same composition used to form the prepolymer, the ratios of aromatic diamine to polyol being sufficient to provide from 0.5–5 equivalents NCO per equivalent polyol; and then, curing the reaction product.

17. The urethane composition of claim 16 wherein the free isocyanate of the prepolymer is from about 8–12% by weight and the ratio of amines to polyol is from about 0.5–2 equivalents amine per equivalent polyol.

18. The urethane composition of claim 16 wherein the free isocyanate content of the propolymer is from about 2–6% by weight and the amount of aromatic diamine is sufficient to provide from about 2–5 equivalents amine per equivalent hydroxyl group.

* * * * *

UNITED STATES PATENT AND TRADEMARK OFFICE
CERTIFICATE OF CORRECTION

PATENT NO. : 4,507,459

DATED : March 26, 1985

INVENTOR(S) : Andreas R. Schmidt, et al.

It is certified that error appears in the above-identified patent and that said Letters Patent is hereby corrected as shown below:

On the title page Item (73), should read;

--(73) Assignee: Air Product and Chemicals, Inc., and LIM International S. A., Allentown, Pa., part interest--.

Signed and Sealed this

Twenty-seventh Day of August 1985

[SEAL]

Attest:

DONALD J. QUIGG

Attesting Officer

Acting Commissioner of Patents and Trademarks